United States Patent
Li et al.

(10) Patent No.: US 11,678,666 B2
(45) Date of Patent: Jun. 20, 2023

(54) HIGH-STRENGTH, HERBICIDAL COMPOSITIONS OF GLYPHOSATE AND 2,4-D SALTS

(71) Applicant: Corteva Agriscience LLC, Indianapolis, IN (US)

(72) Inventors: Mei Li, Westfield, IN (US); Holger Tank, Shanghai (CN); Lei Liu, Carmel, IN (US); Kuide Qin, Chapel Hill, NC (US); Stephen L. Wilson, Zionsville, IN (US); David G. Ouse, Indianapolis, IN (US)

(73) Assignee: CORTEVA AGRISCIENCE LLC, Indianapolis, IN (US)

( * ) Notice: Subject to any disclaimer, the term of this patent is extended or adjusted under 35 U.S.C. 154(b) by 0 days.

(21) Appl. No.: 15/067,893

(22) Filed: Mar. 11, 2016

(65) Prior Publication Data
US 2017/0238548 A1 Aug. 24, 2017

Related U.S. Application Data

(63) Continuation of application No. 12/763,566, filed on Apr. 20, 2010, now abandoned.

(60) Provisional application No. 61/171,592, filed on Apr. 22, 2009.

(51) Int. Cl.
*A01N 57/20* (2006.01)
*A01N 25/02* (2006.01)
*A01N 25/30* (2006.01)
*A01N 39/04* (2006.01)

(52) U.S. Cl.
CPC ............ *A01N 57/20* (2013.01); *A01N 25/02* (2013.01); *A01N 25/30* (2013.01); *A01N 39/04* (2013.01)

(58) Field of Classification Search
CPC ........ A01N 57/20; A01N 39/04; A01N 25/30; A01N 25/02
See application file for complete search history.

(56) References Cited

U.S. PATENT DOCUMENTS

2006/0270556 A1* 11/2006 Wright ................ A01N 57/20
504/165

FOREIGN PATENT DOCUMENTS

| EP | 1 722 634 A1 | 11/2006 |
|----|----|----|
| WO | WO 02/34047 | 5/2002 |
| WO | WO 2006/127501 A | 11/2006 |
| WO | WO2010026127 A1 | 3/2010 |
| WO | WO2010/102102 A1 | 9/2010 |

OTHER PUBLICATIONS

Roundup® Brand Glyphosate-Only Agricultural Herbicides Tank-Mix Guidelines with 2,4-D, Bayer CropScience, 2020.
RT 3® Use & Mixing Instructions, Bayer CropSciences, accessed Mar. 9, 2021.
RT 3® Safety Data Sheet, Bayer CropSciences, Sep. 24, 2020.
Avoid Tank Mixing Errors, Purdue Extension, Sep. 2018.
Roundup Weather Max Herbicide Label, Aug. 2020.
Material Safety Data Sheet, Recoil Broad Spectrum Herbicide. Apr. 2, 2007. Nufarm, Inc, Burr Ridge, IL.
International Search Report and the Written Opinion of the International Searching Authority, dated Jun. 30, 2010, Dow AgroSciences LLC, PCT/US2010/031715.
International Preliminary Report on Patentability, dated Oct. 25, 2011, Dow AgroSciences LLC, WO/2010/123871.

* cited by examiner

*Primary Examiner* — Robert A Wax
*Assistant Examiner* — Danielle Sullivan

(57) ABSTRACT

The mixture of certain amine salts of glyphosate and 2,4-D allows the preparation of high-strength liquid compositions containing up to greater than 450 gae/L of total active ingredient loading if the pH is adjusted to about 6.0 to about 8.0. Compositions are particularly well-suited for application to crops that are resistant or tolerant to both glyphosate and 2,4-D.

19 Claims, No Drawings

HIGH-STRENGTH, HERBICIDAL COMPOSITIONS OF GLYPHOSATE AND 2,4-D SALTS

This application is a Continuation of U.S. patent Ser. No. 12/736,566, filed on 20 Apr. 2010, and claims the benefit of U.S. Provisional Application Ser. No. 61/171,592 filed on 22 Apr. 2009. The present invention relates to high-strength, liquid compositions containing salts of N-(phosphonomethyl)glycine (glyphosate) and (2,4-dichlorophenoxy)acetic acid (2,4-D).

BACKGROUND OF THE INVENTION

Glyphosate and 2,4-D are known, effective herbicides. Various formulations are currently marketed, many of which are aqueous solutions that can be used as is or diluted prior to use. Typically both the glyphosate and the 2,4-D are provided as salts, which exhibit sufficiently high solubility in water to provide a high-strength herbicidal formulation. Pre-mix formulations of glyphosate isopropylamine (IPA) salt and 2,4-D IPA salt are well known in the industry and typically used in burn-down applications. However, the total active ingredient loading (grams acid equivalent per liter [gae/L] glyphosate IPA+gae/L 2,4-D IPA) in the commercially available formulations is limited to less than about 320 gae/L if the ratio of glyphosate (gae/L) to 2,4-D (gae/L) is between the desired ratio of 1:2.3 to 2.3:1. A higher-strength formulation is desirable for a variety of economic and environmental reasons. For example, it is desirable to provide a high-strength formulation to reduce shipping and handling costs and to reduce the amount of packaging material that must be disposed. The high-strength formulations should be stable and retain potency during storage and shipping. Furthermore, the high-strength formulation should be a homogeneous liquid that is stable at temperatures at least as high as 50° C. and should not exhibit any precipitation at temperatures at least as low as 0° C.

SUMMARY OF THE INVENTION

It has now been found that the mixture of certain amine salts of glyphosate and 2,4-D allows the preparation of high-strength liquid compositions containing up to or greater than 450 gae/L of total active ingredient loading if the pH is adjusted to about 6.0 to about 8.0. The present invention provides a homogeneous, stable, high-strength aqueous herbicidal concentrate composition comprising:
  (a) water,
  (b) a glyphosate amine salt, and
  (c) a 2,4-D amine salt,
in which (i) the glyphosate amine salt and the 2,4-D amine salt are independently primary, secondary, tertiary or quaternary alkylamine, alkanolamine or alkylalkanolamine salts, wherein the alkyl and alkanol groups are saturated and contain from $C_1$-$C_3$ carbon atoms individually, with the proviso that no more than one of the amine salts in the composition can be a primary amine salt, (ii) the composition contains a total active ingredient loading of at least 350 gae/L of the glyphosate amine salt and the 2,4-D amine salt, (iii) the weight ratio of the glyphosate amine salt to the 2,4-D amine salt is from about 1:2.3 to about 2.3:1, and (iv) the pH is from about 6.0 to about 8.0. Furthermore, one or more cosolvents and/or efficacy-enhancing surfactants can optionally be incorporated into the high-strength composition while still maintaining the high loading.

In still yet another form, the present invention provides a method of treating plants with the herbicidal composition. The composition is typically applied as a post-emergent herbicide. While the composition can be applied as a highly concentrated solution, it is preferably diluted with water prior to application to the plants. While the composition can be used in a burn-down situation, it is particularly well-suited for application to crops that are resistant or tolerant to both glyphosate and 2,4-D.

DETAILED DESCRIPTION OF THE INVENTION

In general the present invention is directed to a homogeneous, stable, high-strength aqueous herbicidal concentrate composition containing a mixture of amine salts of glyphosate and 2,4-D. More specifically, the present invention provides a high-strength herbicidal concentrate composition comprising:
  (a) water,
  (b) a glyphosate amine salt, and
  (c) a 2,4-D amine salt,
in which (i) the glyphosate amine salt and the 2,4-D amine salt are independently primary, secondary, tertiary or quaternary alkylamine, alkanolamine or alkylalkanolamine salts, with the proviso that no more than one of the amine salts in the composition can be a primary amine salt, wherein the alkyl and alkanol groups are saturated and contain from $C_1$-$C_3$ carbon atoms individually, (ii) the composition contains a total active ingredient loading of at least 350 gae/L of the glyphosate amine salt and the 2,4-D amine salt, (iii) the weight ratio of the glyphosate amine salt to the 2,4-D amine salt is from about 1:2.3 to about 2.3:1, and (iv) the pH is from about 6.0 to about 8.0.

The amine salts of glyphosate and 2,4-D of the present invention may be primary, secondary, tertiary or quaternary alkylamines, alkanolamines or alkylalkanolamines, with the proviso that no more than one of the amine salts in the composition is a primary amine salt. The alkyl groups of such amines are saturated and contain from $C_1$-$C_3$ carbon atoms individually. Examples of preferred amine salts include dimethylamine, trimethylamine, isopropylamine, dimethylethanolamine, diethylethanolamine, diethanolamine, choline or tetramethylammonium salts. While it is often preferred that the amine salts of both glyphosate and 2,4-D be the same, they can be different, particularly when one of the amine salts is primary.

The herbicidal composition includes the glyphosate amine salt and the 2,4-D amine salt in an amount sufficient to provide the high-strength composition. In preferred embodiments, the high-strength herbicidal composition includes a total active ingredient loading greater than about 350 gae/L based on the total glyphosate amine salt and 2,4-D amine salt; more preferably, the high-strength herbicidal composition includes greater than about 450 gae/L based on the total glyphosate amine salt and 2,4-D amine salt; most preferably, the high-strength herbicidal composition includes greater than about 470 gae/L based on the total glyphosate amine salt and 2,4-D amine salt.

In the compositions of the present invention, the weight ratio of the glyphosate amine salt to the 2,4-D amine salt is from about 1:2.3 to about 2.3:1, more preferably from about 1:1.5 to about 1.5:1 and most preferably about 1:1 on an ae basis.

In preferred embodiments, the present invention includes a high-strength herbicidal composition that is storage stable at high temperatures. That is, the composition forms a homogeneous, stable solution that does not exhibit cloudiness under the storage conditions. More preferably, the compositions of the present invention are stable at temperatures greater than or equal to about 50° C.; most preferably, at temperature equal to or greater than about 60° C.

Furthermore, the herbicidal composition also does not exhibit separation or precipitation (or crystallization) of any of the components at low temperatures. For example, the high-strength composition remains a solution at temperatures below about 0° C., more preferably at temperatures below about −10° C., and most preferably at temperatures below about −20° C.

To maintain such stability the pH of the composition of the present invention should be adjusted to from between about 6.0 to about 8.0. The preferred pH is from between about 6.5 to about 7.5. The pH of the composition of the present invention can be conveniently controlled by preparing the high-strength aqueous herbicidal concentrate composition by neutralizing the glyphosate and 2,4-D acids with aqueous solutions of the appropriate amines and using a slight excess of amine to adjust the pH to the desired range.

The high-strength herbicidal composition may optionally include one or more cosolvent and/or an efficacy-enhancing amount of a surfactant or surfactant mixture. In such embodiments, the cosolvent and/or surfactant is selected to be compatible in solution with the high concentration composition. By use of the term "compatible" in the present application, it will be understood by those skilled in the art to include within its meaning that the resulting solution does not exhibit a phase separation or precipitation in the composition that can be initially observed as a cloudiness and which is typically determined at a specified temperature.

Cosolvents conventionally used in the art of formulation and which may also optionally be used in the present compositions are solvents which are totally miscible with water, particularly in the presence of electrolytes. Cosolvents particularly well-suited for use in the present invention are preferably alcohols and glycols containing free hydroxy groups and include methanol, ethanol, isopropanol, amyl alcohol, ethylene glycol, propylene glycol, glycerine, propylene glycol monomethyl ether and diethylene glycol monomethyl ether and the like.

The cosolvent can be included in the herbicidal composition in a desired concentration. If a cosolvent is used, the herbicidal composition includes the cosolvent in amounts between about 20 g/L and about 200 g/L, more preferably in amounts between about 50 g/L and about 100 g/L.

Surfactants conventionally used in the art of formulation and which may also optionally be used in the present compositions are described, inter alia, in "McCutcheon's Detergents and Emulsifiers Annual," MC Publishing Corp., Ridgewood, N.J., 1998 and in "Encyclopedia of Surfactants," Vol. Chemical Publishing Co., New York, 1980-81. Surfactants particularly well-suited for use in the present invention are preferably selected to include one or more of the following types of compounds: alkylamine surfactants having 8 to 22 carbon atoms, such as Armeen DMTD, and Duomeen TTM; alkoxylated alkylamine surfactants having 8 to 22 carbon atoms and a total of 1-20 alkylene oxide groups, available for example from Akzo Nobel as Ethomeen™ C/12, Ethomeen T/12, Ethoduomeen T/13, and Propomeen T/12 respectively; etheramine surfactants, such as Tomah E-14-2, Tomah E-14-5 and Tomah PA-17 from Air Products; amine oxide surfactants, such as Aromox C/12 and Aromox DMC from Akzo Nobel, Ammonyx LO and Ammonyx CDO from Stepan, and Tomah AO-14-2 from Air Products; amidoamine surfactant, such as Adsee C80W from Akzo Nobel; quaternary ammonium surfactants, such as Akzo Nobel's Arquad T/50, Arquad APA-E, Duoquad T/50, Ethoquad™ C/12, and Ethoquad 18/12, and Air Products' Tomah Q-14-2; amphoteric surfactants, such as Dehyton AB-30 from Cognis, Geronol™ CF/AS 30 from Rhodia, and Tego™ Betaine F 50 from Goldschmidt; alcohol ethoxylates, such as Tergitol™ 15S20; alcohol ethoxylate phosphate esters such as Geranol CF/AR from Rhodia; alkylpolyglycosides such as Akzo Nobel AG 6202 or AG 6210; or anionic ester derivatives of alkylpolyglycosides such as the Eucarol™ AGE surfactants.

The surfactant can be included in the herbicidal composition in a desired concentration. If surfactants are used, preferably the desired concentration is sufficient to enhance the herbicidal activity of the resulting composition over that observed with a comparable herbicidal composition without the surfactants. More preferably, the herbicidal composition includes the surfactant in amounts between about 20 g/L and about 200 g/L; most preferably in amounts between about 50 g/L and about 120 g/L.

The compositions described herein can be applied to plants in an amount sufficient to induce an herbicidal effect. For example, a composition prepared according the present invention can be applied as an aqueous solution to plants including the plants' leaves, stems, branches, flowers and/or fruit. The herbicidal composition can be applied in an herbicidally effective amount sufficient to inhibit plant growth or kill individual plants.

The agricultural compositions prepared according to the present invention are highly effective as an herbicide composition against a variety of weeds. The compositions of the present invention can be used as is or combined with other components including other agriculturally acceptable additives commonly used in formulated agricultural products, such as antifoam agents, compatibilizing agents, sequestering agents, neutralizing agents and buffers, corrosion inhibitors, dyes, odorants, penetration aids, wetting agents, spreading agents, drift control agents, dispersing agents, thickening agents, freeze point depressants, antimicrobial agents, crop oil, other biologically and/or agriculturally active components and the like. The concentrated agricultural compositions are typically diluted in water and then applied by conventional means well known to those in the art.

The concentrated agricultural compositions of the present invention are particularly well-suited for application to crops that are resistant or tolerant to both glyphosate and 2,4-D. They can, further, be used in conjunction with glufosinate, dicamba or imidazolinones on glufosinate-tolerant, dicamba-tolerant or imidazolinone-tolerant crops.

Example 1: Preparation of Glyphosate Amine Salt Solutions 504 g glyphosate technical (equivalent to 480 g glyphosate acid) was reacted with 1.25 molar equivalents of amine aqueous solutions to form a homogeneous clear solution at ambient temperature. Then, the pH of the solution was adjusted to a range of 6-7.5 (Table 1) using additional amine Water was added, if needed, to reach a concentration of glyphosate given in Table 1.

TABLE 1

| Sample ID | Amine type | Glyphosate acid equivalent content (ae wt %) | (g ae/l) | pH |
|---|---|---|---|---|
| G-1-1 | Dimethylamine (DMA) | 39.8 | 480 | 6.1 |
| G-1-2 | Dimethylamine (DMA) | 39.9 | 480 | 7.4 |
| G-1-3 | Dimethylamine (DMA) | 40.5 | 489 | 7.3 |
| G-2 | Isopropylamine (IPA) | 40.7 | 480 | 6.13 |
| G-3-1 | Dimethylethanolamine (DMEnolA) | 38.9 | 480 | 6.0 |
| G-3-2 | Dimethylethanolamine (DMEnolA) | 38.7 | 475 | 7.1 |
| G-4 | Diethylethanolamine (DEEnolA) | 38.8 | 481 | 6.16 |
| G-5 | Choline hydroxide (Choline) | 37.1 | 463 | 7.2 |
| G-6 | Tetramethylammonium hydroxide (TetraMA) | 38.5 | 462 | 7.3 |

TABLE 2

| Sample ID | Amine type | 2,4-D acid equivalent content (ae wt %) | (gae/L) | pH |
|---|---|---|---|---|
| D-1 | Dimethylamine (DMA) | 41.4 | 482 | 7.1 |
| D-2-1 | Isopropylamine (IPA) | 41.6 | 480 | 7.3 |
| D-2-2 | Isopropylamine (IPA) | 41.7 | 480 | 9.3 |
| D-3-1 | Dimethylethanolamine (DMEnolA) | 40.6 | 486 | 8.35 |
| D-3-2* | Dimethylethanolamine (DMEnolA) | 40.3 | 480 | 7.8 |
| D-3-3 | Dimethylethanolamine (DMEnolA) | 40.6 | 486 | 7.1 |
| D-4 | Diethylethanolamine (DEEnolA) | 40.5 | 477 | 7.2 |
| D-5 | Choline hydroxide (Choline) | 41.0 | 492 | 7.6 |
| D-6 | Tetramethylammonium hydroxide (TetraMA) | 41.0 | 474 | 7.4 |

*10 wt % propylene glycol was incorporated in the composition.

Example 2: Preparation of 2,4-D Amine Salt Solutions 495 g 2,4-D technical (equivalent to 480 g 2,4-D acid) was reacted with 1.02 molar equivalents or higher amount of amine aqueous solutions to form a homogeneous clear solution at ambient temperature. Then, additional water was added, if needed, to reach a concentration of 2,4-D given in Table 2.

Example 3: Preparation of Glyphosate and 2-4-D Compositions

Compositions were prepared by mixing a glyphosate salt solution in Table 1 with a 2,4-D salt solution in Table 2 and water if needed. The examples illustrated in Table 3 showed the storage stability of the prior art compositions containing glyphosate and 2,4-D isopropylamine (IPA) salts. The examples given in Table 4 demonstrate the invention.

TABLE 3

| Formulation ID | Glyphosate salt solution, (amine type) | 2,4-D salt solution, (amine type) | Total active content (gae/L) | Weight ratio of glyphosate/2,4-D | Storage stability* Ambient | −10° C. |
|---|---|---|---|---|---|---|
| 1 | G-2, (IPA) | D-2-1, (IPA) | 400 | 1:2.3 | x | x |
| 2 | G-2, (IPA) | D-2-1, (IPA) | 400 | 1:1 | x | x |
| 3 | G-2, (IPA) | D-2-1, (IPA) | 400 | 2.3:1 | x | x |
| 4 | G-2, (IPA) | D-2-2, (IPA) | 400 | 1:2.3 | x | x |
| 5 | G-2, (IPA) | D-2-2, (IPA) | 400 | 1:1 | x | x |
| 6 | G-2, (IPA) | D-2-2, (IPA) | 400 | 2.3:1 | x | x |
| 7 | G-2, (IPA) | D-2-2, (IPA) | 360 | 1:2.3 | ✓ | ✓ |
| 8 | G-2, (IPA) | D-2-1, (IPA) | 360 | 1:1 | ✓ | PS |
| 9 | G-2, (IPA) | D-2-2, (IPA) | 320 | 1:1 | ✓ | ✓ |
| 10 | G-2, (IPA) | D-2-2, (IPA) | 320 | 2.3:1 | ✓ | PS |

Storage stability:
"✓" indicated a clear, homogeneous, free-flowing fluid without any phase separation or crystallization after at least 3 days of storage at a given temperature;
"x" indicated crystallization of either salt or water in the formulation;
"PS" indicated a phase separation being observed in the formulation.

TABLE 4

| Formulation ID | Glyphosate salt solution, (amine type) | 2,4-D salt solution, (amine type) | Total active content (gae/L) | Weight ratio of glyphosate/2,4-D | Storage stability* ambient | −10° C. |
|---|---|---|---|---|---|---|
| 11 | G-1-1, (DMA) | D-1, (DMA) | 480 | 1:2.3 | ✓ | x |
| 12 | G-1-2, (DMA) | D-1, (DMA) | 480 | 1:2.3 | ✓ | ✓ |
| 13 | G-1-2, (DMA) | D-1, (DMA) | 440 | 1:2.3 | ✓ | ✓ |
| 14 | G-1-2, (DMA) | D-1, (DMA) | 440 | 1:1 | ✓ | ✓ |
| 15 | G-1-2, (DMA) | D-1, (DMA) | 400 | 1:2.3 | ✓ | ✓ |
| 16 | G-1-2, (DMA) | D-1, (DMA) | 400 | 1:1 | ✓ | ✓ |
| 17 | G-1-2, (DMA) | D-1, (DMA) | 400 | 2.3:1 | ✓ | PS |
| 18 | G-3-1, (DMEnolA) | D-3-1, (DMEnolA) | 480 | 1:2.3 | ✓ | ✓ |
| 19 | G-3-2, (DMEnolA) | D-3-1, (DMEnolA) | 480 | 1:2.3 | ✓ | ✓ |
| 20 | G-3-2, (DMEnolA) | D-3-1, (DMEnolA) | 480 | 1:1 | ✓ | ✓ |

TABLE 4-continued

| Formulation ID | Glyphosate salt solution, (amine type) | 2,4-D salt solution, (amine type) | Total active content (gae/L) | Weight ratio of glyphosate/ 2,4-D | Storage stability* ambient | Storage stability* −10° C. |
|---|---|---|---|---|---|---|
| 21 | G-3-1, (DMEnolA) | D-3-3, (DMEnolA) | 480 | 2.3:1 | ✓ | ✓ |
| 22 | G-3-1, (DMEnolA) | D-3-1, (DMEnolA) | 440 | 1:1 | ✓ | ✓ |
| 23 | G-3-2, (DMEnolA) | D-3-1, (DMEnolA) | 440 | 1:1 | ✓ | ✓ |
| 24 | G-3-1, (DMEnolA) | D-3-1, (DMEnolA) | 400 | 1:1 | ✓ | ✓ |
| 25 | G-4, (DEEnolA) | D-4, (DEEnolA) | 480 | 1:2.3 | ✓ | ✓ |
| 26 | G-4, (DEEnolA) | D-4, (DEEnolA) | 480 | 1:1 | ✓ | PS |
| 27 | G-4, (DEEnolA) | D-4, (DEEnolA) | 480 | 2.3:1 | ✓ | PS |
| 28 | G-4, (DEEnolA) | D-4, (DEEnolA) | 440 | 1:1 | ✓ | ✓ |
| 29 | G-4, (DEEnolA) | D-4, (DEEnolA) | 440 | 2.3:1 | ✓ | PS |
| 30 | G-5, (Choline) | D-5, (Choline) | 480 | 1:2.3 | ✓ | ✓ |
| 31 | G-5, (Choline) | D-5, (Choline) | 480 | 1:1 | ✓ | ✓ |
| 32 | G-5, (Choline) | D-5, (Choline) | 440 | 1:2.3 | ✓ | ✓ |
| 33 | G-5, (Choline) | D-5, (Choline) | 440 | 1:1 | ✓ | ✓ |
| 34 | G-5, (Choline) | D-5, (Choline) | 440 | 2.3:1 | ✓ | ✓ |
| 35 | G-6, (TetraMA) | D-6, (TetraMA) | 470 | 1:2.3 | ✓ | ✓ |
| 36 | G-6, (TetraMA) | D-6, (TetraMA) | 440 | 1:1 | ✓ | ✓ |
| 37 | G-6, (TetraMA) | D-6, (TetraMA) | 400 | 2.3:1 | ✓ | ✓ |
| 38 | G-2, (IPA) | D-1, (DMA) | 480 | 1:2.3 | ✓ | ✓ |
| 39 | G-2, (IPA) | D-3-1, (DMEnolA) | 480 | 1:2.3 | ✓ | x |
| 40 | G-1-1, (DMA) | D-3-1, (DMEnolA) | 480 | 1:2.3 | ✓ | ✓ |
| 41 | G-1-2, (DMA) | D-3-1, (DMEnolA) | 480 | 1:2.3 | ✓ | ✓ |
| 42 | G-1-1, (DMA) | D-3-3, (DMEnolA) | 480 | 1:1 | ✓ | PS |
| 43 | G-3-2, (DMEnolA) | D-1, (DMA) | 480 | 1:2.3 | ✓ | ✓ |

Storage stability:
"✓" indicated a clear, homogeneous, free-flowing fluid without any phase separation or crystallization after at least 3 days of storage at a given temperature;
"x" indicated crystallization of either salt or water in the formulation;
"PS" indicated a phase separation being observed in the formulation.

Example 4: Glyphosate and 2,4-D Compositions with Improved Cold Temperature Storage Stability by Using Co-Solvent Composition (with composition ID of 44) was prepared by mixing 10 g of glyphosate DMA salt solution (G-1-3 in Table 1) with 10 g of 2,4-D DMEnolA salt solution (D-3-2 in Table 2, containing 10 wt % propylene glycol as cosolvent) at a weight ratio of 1:1. The total active content is 480 gae/L. The composition contains 5 wt % propylene glycol. It formed a clear, homogeneous solution after preparation at ambient temperature. It was storage stable at 54, 0, −10, and −20° C. for at least 2 weeks, without phase separation or crystal formation being observed. The compositions were clear, homogeneous, free-flowing fluids.

Example 5: Glyphosate and 2,4-D Compositions with Built-in Surfactants

A glyphosate DMA salt concentrate was prepared by reacting 435 g glyphosate technical (equivalent to 414 g glyphosate acid) with 475 g of a 40% aqueous dimethylamine solution in 90 g water. The resulting solution had a pH of 7.2 and a density of 1.218 g/mL.

Then, a 2,4-D DMEnolA salt concentrate was prepared by reacting 547.5 g 2,4-D technical (equivalent to 536 g 2,4-D acid) with 217 g of dimethylethanolamine in 260 g water. The resulting solution had a pH of 7.5 and a density of 1.254 g/mL.

Formulations were prepared by mixing 10.63 g or 11.19 g of the above 2,4-D DMEnolA salt concentrate, 1.5 g of propylene glycol, 13.77 g or 14.5 g of the above glyphosate DMA salt concentrate, and 1.88 g of surfactants in a 25 mL volumetric flask. Additional water was added, if needed, to reach the target volume. The resulting formulations contained 228 or 240 gae/L 2,4-D DMEnolA salt and 228 or 240 gae/L glyphosate DMA salt. The examples given in Table 5 demonstrate the invention.

TABLE 5

| Composition ID | Glyphosate content (gae/L) | 2,4-D content (gae/L) | Surfactant |
|---|---|---|---|
| 45 | 240 | 240 | Ethomeen T/12 |
| 46 | 240 | 240 | Ethomeen C/12 |
| 47 | 228 | 228 | Armeen DMTD |
| 48 | 228 | 228 | Duomeen TTM |
| 49 | 228 | 228 | Ethoduomeen T/13 |
| 50 | 228 | 228 | Propomeen T/12 |
| 51 | 228 | 228 | Arquad T-50 |
| 52 | 240 | 240 | Duoquad T-50 |
| 53 | 228 | 228 | AG 6202 |
| 54 | 240 | 240 | Tomah Q-14-2 |
| 55 | 240 | 240 | Aromox C/12 |
| 56 | 240 | 240 | Geronol CF/AR |
| 57 | 240 | 240 | Stepan's X-3705-44 |
| 58 | 240 | 240 | Stepan's X-3600-98 |
| 59 | 240 | 228 | Ammonyx LO |
| 60 | 240 | 228 | Geronol CF/AS 30 + Adsee C80W (w/w = 2/1) |
| 61 | 240 | 228 | Geronol CF/AS 30 + Ethomeen T/12 (w/w = 2/1) |

Ethomeen C/12 and T/12 are ethoxylated (2) alkylamine from Akzo Nobel
Armeen DMTD is a tallowalkyl-dimethylamines from Akzo Nobel
Duomeen TTM is a N,N,N'-trimethyl-N'-tallow-1,3-diaminopropane from Akzo Nobel
Ethoduomeen T/13 is an ethoxylated (3) N-tallow-1,3-diaminopropane from Akzo Nobel
Propomeen T/12 is a N-tallowalkyl-1,1'-iminobis-2-propanol from Akzo Nobel
Arquad T-50 is a tallowalkyltrimethyl ammonium chloride from Akzo Nobel
Duoquad T-50 is a N,N,N',N',N'-pentamethyl-N-tallow-1,3-propane diammonium dichloride from Akzo Nobel
AG 6202 is an alkylpolyglucoside from Akzo Nobel
Tomah Q-14-2 is an isodecyloxypropyl methyl bis(2-hydroxyethyl) ammonium chloride from Air Products
Aromox C/12 is an ethoxylated (2) alkylamine oxide from Akzo Nobel
Geronol CF/AR is an alcohol ethoxylate phosphate ester from Rhodia
Stepan's X-3705-44 is a proprietary alkylamine oxide from Stepan
Stepan's X-3600-98 is a proprietary esterquad from Stepan
Ammonyx LO is a lauramine oxide from Stepan
Adsee C80W is an alkyl Amidopropyldimethylamine from Akzo Nobel All formulations in Table 5 are homogeneous and free-flowing liquid at a temperature ranging from 54° C. to −10° C. without any phase separation or crystal formation being observed for at least 2 weeks.

The viscosity of composition #54 was measured with a TA AR1000 Rheometer. The results were showed in Table 6.

TABLE 6

| Temperature (° C.) | Viscosity (mPa · s) |
|---|---|
| −10 | 490 |
| 0 | 244 |
| 10 | 125 |
| 20 | 72 |
| 40 | 36 |

The invention claimed is:

1. A homogeneous, stable, high-strength aqueous herbicidal concentrate composition comprising:
   (a) water,
   (b) a glyphosate amine salt, and
   (c) a 2,4-D choline salt,
   in which (i) the glyphosate amine salt is a primary, secondary, tertiary or quaternary alkylamine, alkanolamine or alkylalkanolamine salts is choline, wherein the alkyl and alkanol groups are saturated and contain from $C_1$-$C_3$ carbon atoms individually, with the proviso that no more than one of the amine salts in the composition is a primary amine salt, (ii) the concentrate composition contains a total active ingredient loading of at least 350 gae/L of the glyphosate amine salt and the 2,4-D choline salt, (iii) the weight ratio of the glyphosate amine salt to the 2,4-D choline salt of the concentrate composition is from 1:2.3 to 2.3:1, (iv) the pH of the concentrate composition is from 6.0 to 8.0; and (v) does not exhibit separation or precipitation at a temperature below about 0° C.

2. The concentrate composition of claim 1, wherein the total active ingredient loading is greater than 450 grams of acid equivalent/L of the glyphosate amine salt and the 2,4-D choline salt.

3. The concentrate composition of claim 1, wherein the weight ratio of the glyphosate amine salt to the 2,4-D choline salt is 1:1.

4. The concentrate composition of claim 1, wherein the pH is from 6.5 to 7.5.

5. The concentrate composition of claim 1, further comprising between 20 g/L and 200 g/L of at least one cosolvent.

6. The concentrate composition of claim 1, further comprising at least one efficacy enhancing surfactant in an amount between 20 g/L and 200 g/L.

7. A method of controlling undesirable vegetation in crops that are resistant or tolerant to both glyphosate and 2,4-D which comprises applying to the undesirable vegetation and the crops that are resistant or tolerant to both glyphosate and 2,4-D a water-diluted composition of the concentrate composition of claim 1.

8. The composition of claim 1, wherein the composition contains a 2,4-D loading of at least 228 gae/L.

9. The concentrate composition of claim 1, wherein the composition contains a glyphosate loading of at least 228 gae/L.

10. The concentrate composition of claim 8, wherein the composition contains a 2,4-D loading of at least 240 gae/L.

11. The concentrate composition of claim 9, wherein the composition contains a glyphosate loading of at least 240 gae/L.

12. The concentrate composition of claim 11, wherein the composition contains a 2,4-D loading of at least 228 gae/L.

13. The concentrate composition of claim 10, wherein the composition contains a glyphosate loading of at least 228 gae/L.

14. The concentrate composition of claim 1, wherein the composition has no phase separation or crystal formation for at least two weeks and is a free-flowing liquid at temperatures from 54° C. to −10° C.

15. The concentrate composition of claim 1, wherein the composition i) forms a clear homogeneous solution, has no phase separation or crystal formation for at least two weeks and is a free-flowing liquid at temperatures greater than −20° C.

16. A method for controlling undesirable vegetation in crops comprising:
   applying a herbicidal concentrate composition to a plant, wherein the herbicidal concentrate composition comprises:
   (a) water,
   (b) a glyphosate amine salt, and
   (c) a 2,4-D choline salt, in which
      (i) the glyphosate amine salt is a primary, secondary, tertiary or quaternary alkylamine, alkanolamine or alkylalkanolamine salts, wherein alkyl and alkanol groups are saturated and contain from $C_1$-$C_3$ carbon atoms individually, with the proviso that no more than one of the amine salts in the composition is a primary amine salt,
      (ii) the herbicidal concentrate composition contains a total active ingredient loading of at least 350 gae/L of the glyphosate amine salt and the 2,4-D choline salt,
      (iii) the weight ratio of the glyphosate amine salt to the 2,4-D choline salt in the herbicidal concentrate composition is from 1:2.3 to 2.3:1,
      (iv) the pH of the concentrate composition is from 6.0 to 8.0,
      (v) does not exhibit separation or precipitation at a temperature below about 0° C.

17. The method of claim 16, further comprising diluting the herbicidal concentrate composition with water prior to applying the herbicidal concentrate composition to the plant.

18. The concentrate composition of claim 9, wherein the weight ratio of the glyphosate amine salt to the 2,4-D choline salt is 1:1.

19. A homogeneous, stable, high-strength aqueous herbicidal concentrate composition comprising:
   (a) water,
   (b) a glyphosate amine salt, and
   (c) a 2,4-D choline salt, in which
      (i) the glyphosate amine salt is a primary, secondary, tertiary or quaternary alkylamine, alkanolamine or alkylalkanolamine salts, wherein the alkyl and alkanol groups are saturated and contain from $C_1$-$C_3$ carbon atoms individually, with the proviso that no more than one of the amine salts in the composition is a primary amine salt,
      (ii) the concentrate composition contains a total active ingredient loading of at least 350 gae/L of the glyphosate amine salt and the 2,4-D choline salt,
      (iii) the weight ratio of the glyphosate amine salt to the 2,4-D choline salt of the concentrate composition is from 1:2.3 to 2.3:1, and
      (iv) the pH of the concentrate composition is from 6.5 to 7.5.

* * * * *